United States Patent
Liu

(10) Patent No.: US 12,389,509 B1
(45) Date of Patent: Aug. 12, 2025

(54) OVERCURRENT AND OVERLOAD PROTECTION CIRCUIT FOR LED LIGHT STRING

(71) Applicant: Silver Beauty Electronic and Lighting Co., Ltd., HeShan (CN)

(72) Inventor: Huawang Liu, HeShan (CN)

( * ) Notice: Subject to any disclaimer, the term of this patent is extended or adjusted under 35 U.S.C. 154(b) by 0 days.

(21) Appl. No.: 19/056,673

(22) Filed: Feb. 18, 2025

(30) Foreign Application Priority Data

Dec. 24, 2024 (CN) .......................... 202411911720.3

(51) Int. Cl.
| | |
|---|---|
| *H05B 45/50* | (2022.01) |
| *H05B 45/34* | (2020.01) |
| *H05B 45/375* | (2020.01) |
| *H05B 47/19* | (2020.01) |
| *H05B 47/25* | (2020.01) |

(52) U.S. Cl.
CPC ............ *H05B 45/50* (2020.01); *H05B 45/34* (2020.01); *H05B 45/375* (2020.01); *H05B 47/19* (2020.01); *H05B 47/25* (2020.01)

(58) Field of Classification Search
CPC ......... H05B 45/34; H05B 47/19; H05B 45/50
See application file for complete search history.

(56) References Cited

U.S. PATENT DOCUMENTS

| | | | | |
|---|---|---|---|---|
| 2013/0293109 | A1* | 11/2013 | Cheon ................... | H05B 47/25 315/122 |
| 2015/0237700 | A1* | 8/2015 | Woytowitz ............. | H05B 47/19 315/307 |
| 2019/0313503 | A1* | 10/2019 | Woytowitz ........... | H05B 47/185 |
| 2023/0074671 | A1* | 3/2023 | Woytowitz ........... | H05B 47/185 |

* cited by examiner

*Primary Examiner* — Monica C King
(74) *Attorney, Agent, or Firm* — Novoclaims Patent Services LLC; Mei Lin Wong

(57) ABSTRACT

An overcurrent and overload protection circuit of an LED light string includes an LED light string control circuit 20 connecting to a protection circuit 10 and a wireless receiving circuit 30 respectively. The protection circuit 10 includes a first, a second, and a fourth switch transistors Q1, Q2, and Q4 connected in parallel to an input terminal of a power supply, and a third switch transistor Q3 connected in parallel with the first and the fourth switch transistor Q1, Q4 respectively. The LED light string control circuit 20 comprises an LED light string forward and reverse output circuit 21, a step-down voltage stabilization circuit 22 and a main control chip U2 connected to the LED light string forward and reverse output circuit 21. When the LED light string is overloaded or short-circuited, the circuit can be cut off by promptly disconnecting the switch transistor of the control circuit.

20 Claims, 2 Drawing Sheets

OVERCURRENT AND OVERLOAD PROTECTION CIRCUIT FOR LED LIGHT STRING

CROSS REFERENCE OF RELATED APPLICATION

This is a non-provisional application that claims priority to Chinese application number 2024119117203, filing date Dec. 24, 2024, the entire contents of each of which are expressly incorporated herein by reference.

BACKGROUND OF THE PRESENT INVENTION

Field of Invention

The present invention relates to an LED light string for lighting decoration, and more particularly to an overcurrent and overload protection circuit for an LED light string.

Description of Related Arts

LED light strings can not only be used as a lighting device, but also can be used as a light source for advertising light boxes, product working status indicators, electronic signs, and lighting decorations such as Christmas trees and handicrafts. When multiple devices of existing LED lamps are connected for use, for example, when multiple LED lamp beads are connected into a Christmas decorative light string, the traditional connection method is mostly parallel or series connection. The problems of this type of single connection method are obvious. In the traditional parallel structure, each device is connected in parallel to the wires of the power supply, which inevitably leads to voltage reduction problems. When multiple devices are used in series, if one of the connecting devices in series fails, the voltage of other devices will rise, thereby increasing the load of other devices and greatly shortening the service life of the other devices that are still working, and may even damage the other devices, causing the entire light string to fail to operate normally. Therefore, overcurrent and overload control of an LED light string becomes a key factor for normal and continuous use of the LED light string. However, existing control methods and devices are either complex in structure or having single function, resulting in frequent failures in actual use.

SUMMARY OF THE PRESENT INVENTION

An objective of the present invention is to solve the above problem and provide an overcurrent and overload protection circuit for an LED light string that can cut off the circuit by promptly disconnecting the switch transistor of the control circuit when the LED light string is overloaded or short-circuited, thereby avoiding fires caused by line faults and extending the service life of the product.

To achieve the above objective, the present invention provides an overcurrent and overload protection circuit for an LED light string, which comprises: .a protection circuit connected to a power circuit, an LED light string control circuit connected to the protection circuit, and a wireless receiving circuit connected to the LED light string control circuit for remotely controlling the LED light string, wherein the protection circuit comprises a first switch transistor Q1, a second switch transistor Q2, a third switch transistor Q3, and a fourth switch transistor Q4 for preventing the LED light string from overcurrent and overload, the first switch transistor Q1, the second switch transistor Q2, and the fourth switch transistor Q4 are connected in parallel to an input terminal of a power supply (such as a power circuit of LED light string), the third switch transistor Q3 is connected in parallel with the first switch transistor Q1 and the fourth switch transistor Q4 respectively, the LED light string control circuit 20 comprises an LED light string forward and reverse output circuit, a step-down voltage stabilization circuit connected to the LED light string forward and reverse output circuit and a main control chip U2.

The protection circuit comprises resistors R1, R4, R2, R3, R7, a current limiting resistor RL and a sampling resistor R6, wherein the first switch transistor Q1, the second switch transistor Q2, and the fourth switch transistor Q4 are connected to an external power supply through resistors R1, R4, R2, and R3, the third switch transistor Q3 is connected to the first switch transistor Q1 and the fourth switch transistor Q4 respectively, and is connected to the step-down voltage stabilization circuit of the LED light string control circuit 20 through the current limiting resistor RL, the sampling resistor R6 and the resistor R7 connected in parallel with the third switch transistor Q3.

Preferably and specifically, the LED light string forward and reverse output circuit comprises field effect transistors T1, T2, T3, T4 connected in forward and reverse directions; and resistors R10, R12, R13, R14, R15, R16, wherein the collectors of the field effect transistors T1 and T4 are connected, the collectors of the field effect transistors T2 and T3 are connected, and a connecting wire between the field effect transistors T1 and T4 and the field effect transistors T2 and T3 are connected in parallel with LED light strings LED1, LED2 and resistor R17, and the field effect transistors T1, T2, T3, and T4 are respectively connected with the resistors R10, R12, R13, R14, R15, and R16.

Preferably, the step-down voltage stabilization circuit of the LED light string control circuit comprises a step-down voltage regulator chip U1, capacitors C1, C2, C3, C4, a crystal oscillator Y1 and a resistor R8, wherein the capacitors C1, C2, C3, C4 are connected between the step-down voltage regulator chip U1 and the main control chip U2.

The main control chip U2 of the LED light string control circuit is connected to the step-down voltage stabilization circuit through a resistor R8, and is connected to the field effect transistor T1 of the LED light string control circuit through resistors R9 and R10, the main control chip U2 is further connected to an RF input interface of the wireless receiving circuit and is connected to an on-off switch SW.

The wireless receiving circuit comprises an RF chip U3, a crystal oscillator Y2 connected in parallel to the RF chip U3, inductors L1 and L2 connected in parallel to capacitors C5 and C6 on the RF chip U3, and capacitors C7 and C8 connected to the RF chip U3 and connected in parallel to resistor R18. The wireless receiving circuit is connected to the main control chip U2 for wireless remote control of the LED light string.

The LED light string control circuit is connected to an external LED light string through light string output nodes 01 and 02.

Specifically, under leakage or short circuit condition occurred at the output nodes 01 and 02 of the LED light string, a current in the circuit rises sharply, causing a voltage across the current limiting resistor RL to rise synchronously, when a voltage at the node C is lower than a voltage of the node B by a preset value, the third switch transistor Q3 is turned on, the resistor R5 limits the current and then the fourth switch transistor Q4 is turned on and a voltage of node E is proximal to 0V, thereby causing the second switch transistor Q2 being turned off immediately; at the same time, a high voltage reaches a base of the first switch transistor Q1 through the resistors R2 and R3 such that the first switch transistor Q1 is disconnected while the output node B is suspended, then an extremely low current at node B fails to start the step-down voltage regulator chip U1, causing the step-down voltage regulator chip U1 stop running, then the resistors R9 and R11 have no output, and the LED light string control circuit is disconnected, thereby achieving overcurrent and overload protection of the LED light string, when the LED light string returns to normal, the voltage at node C rises, the third switch transistor Q3 is disconnected while the node D is suspended, the fourth switch transistor Q4 is disconnected, and then the voltage at node E rises back up, the second switch transistor Q2 is turned on and the first switch transistor Q1 is turned to resume normal working condition.

The advantageous effect of the present invention is that it effectively solves the problem of safe use of LED light strings. When leakage or short-circuit occurs at the LED light string output nodes 01 and 02, the protection circuit of the present invention can turn off the first switch transistor Q1, stop the step-down voltage regulator chip U1 from working, and disconnect the LED light string control circuit by turning on the connection between the third switch transistor Q3 and the fourth switch transistor Q4 and turning off the second switch transistor Q2. The LED light string control circuit of the present invention ensures the output current capacity and protection efficiency of the LED light string through the forward and reverse connected field effect transistors T1, T2, T3, and T4. The wireless receiving circuit of the present invention can wirelessly and remotely control the lighting effect and on/off of the LED light string.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Furthermore, "connected" may also mean direct connection or indirect connection, or connection through other auxiliary components. Therefore, the above terms should not be an actual connection limitation of the elements of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Figure 1:
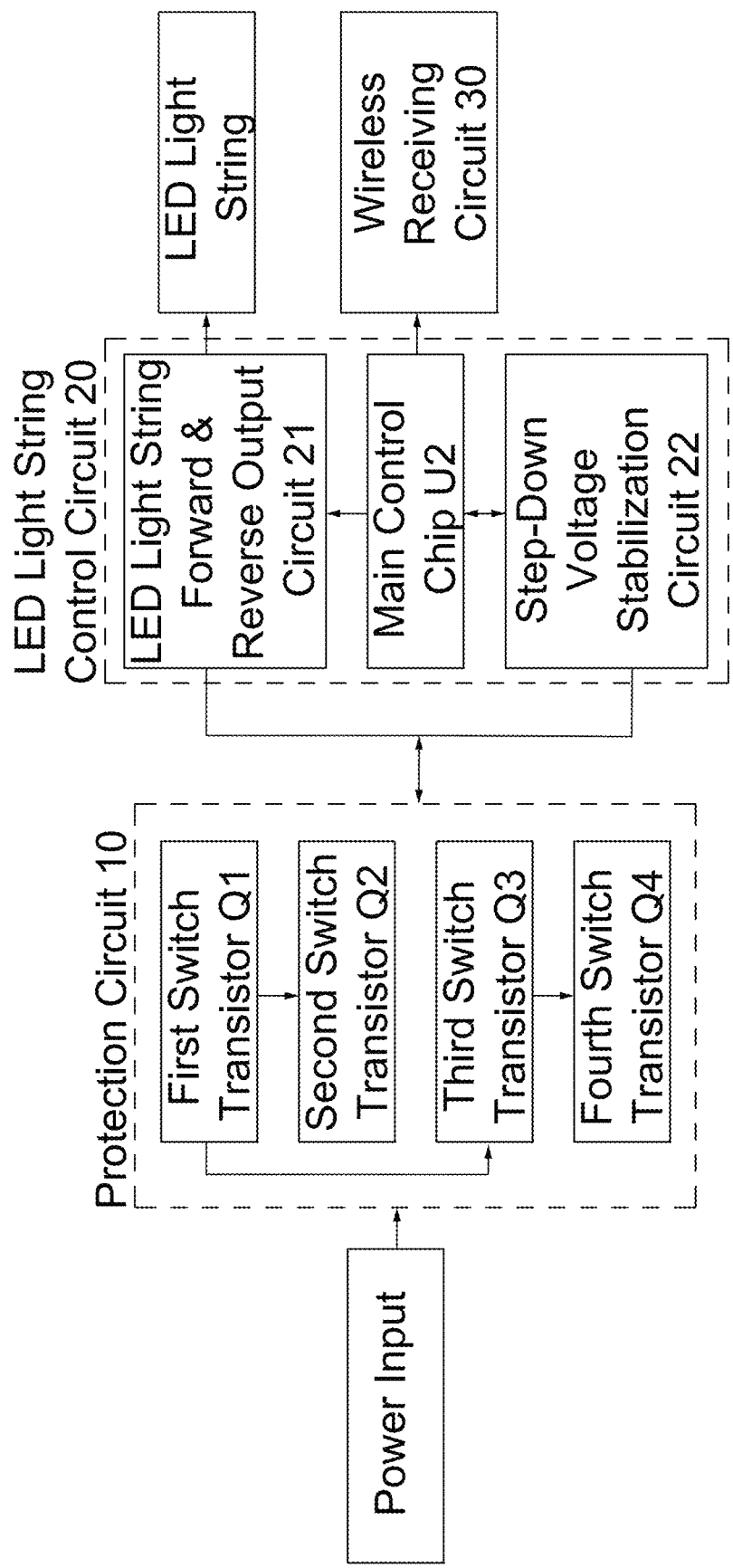
FIG. 1 a schematic diagram of the overall structural components according to a preferred embodiment of the present invention.
Figure 2:
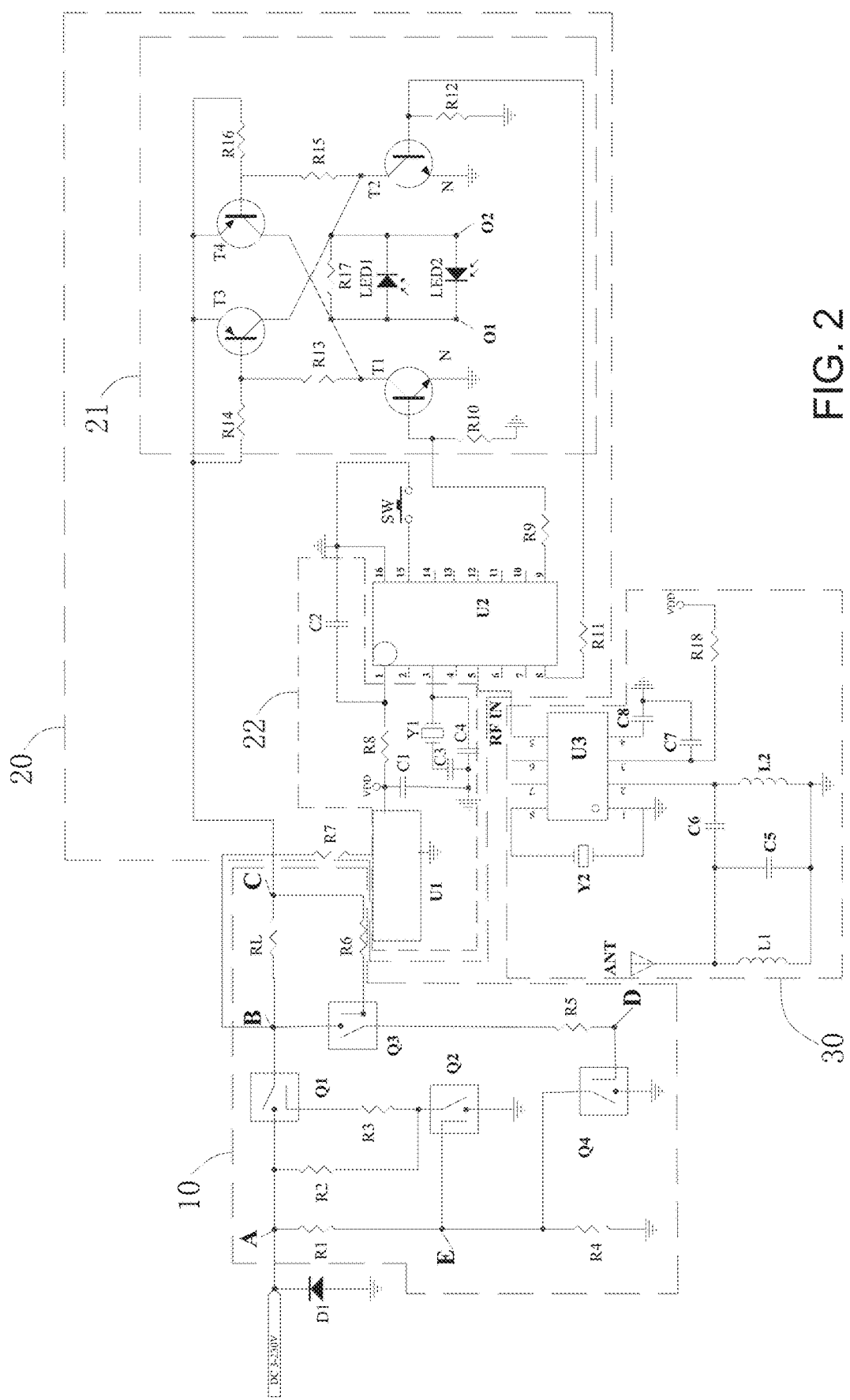
FIG. 2 is a circuit diagram according to the above preferred embodiment of the present invention.

Referring to FIG. 1 and FIG. 2 of the drawings, an overcurrent and overload protection circuit of an LED light string according to preferred embodiment of the present invention is illustrated. The overcurrent and overload protection circuit of the LED light string includes a protection circuit 10, an LED light string control circuit 20 and a wireless receiving circuit 30. The protection circuit 10 is used to prevent the LED light string from overcurrent and overload. It uses a combination of several switching transistors so that when the output nodes 01 and 02 of the LED light string leak or short circuit, the switching transistor can cut off the circuit in time to ensure the safe use of the LED light string. The LED light string control circuit 20 maintains the output current capability and protection efficiency through the forward and reverse circuits. The wireless receiving circuit 30 provides an optional remote-control mode for the LED light string. According to this embodiment, the LED light string refers to a light string that connects multiple LED lamp beads to form a lighting decoration, which can be installed on lighting decoration products such as Christmas trees. The present invention will be further described in detail below with reference to the embodiments and drawings.

Referring to FIG. 1 and FIG. 2 of the drawings, the protection circuit 10 comprises a first switch transistor Q1, a second switch transistor Q2, a third switch transistor Q3, a fourth switch transistor Q4, resistors R1, R4, R2, R3, R7, a current limiting resistor RL and a sampling resistor R6. The first switch transistor Q1 is a high-output power switch transistor with a power of 100 W. The first switch transistor Q1 can also be a field effect transistor, and a size of its carrying current determines a carrying capacity of the entire circuit. As shown in FIG. 2 of the drawings, resistors R2 and R3 are connected in parallel between the first switch transistor Q1 and the second switch transistor Q2. A current limiting resistor RL is also connected in series to the first switch transistor Q1. The resistance value of the current limiting resistor RL determines the size of the protective load leakage and short-circuit current. The higher the resistance value, the smaller the current, and the smaller the resistance value, the larger the current. Also, the current limiting resistor RL can also serve to limit the current of the LED light string. According to this embodiment, the resistance of the current limiting resistor RL is 0.1 to 3 ohms. The third switch transistor Q3 is connected in parallel with the first switch transistor Q1 and the fourth switch transistor Q4 through the resistor R5, the current limiting resistor RL, and the sampling resistor R6. The resistors R1 and R4 are connected in parallel between the first switch transistor Q1, the second switch transistor Q2, the fourth switch transistor Q4 and the external power supply. The first switch transistor Q1, the second switch transistor Q2, and the fourth switch transistor Q4 are connected to an external power supply through resistors R1, R4, R2, and R3. The first switch transistor Q1 and the third switch transistor Q3 are connected to a step-down voltage stabilization circuit 22 of the LED light string control circuit through the current limiting resistor RL, the sampling resistor R6, and the resistor R7.

As shown in FIG. 2, when leakage or short circuit occurs at the output nodes 01 and 02 of the LED light string while the protection circuit 10 is working, the current in the circuit will rise sharply, causing the voltage across the current limiting resistor RL to rise synchronously. When the voltage of node C is about 0.7V lower than the voltage of node B, the third switch transistor Q3 is turned on, and the fourth switch transistor Q4 is turned on after the resistor R5 limits the current. At this point, the voltage of node E is close to 0V, causing the second switch transistor Q2 being turned off immediately. At the same time, the high voltage reaches the base of the first switch transistor Q1 through the resistors R2 and R3, so that the first switch transistor Q1 is disconnected, and the output node B is suspended. Since the extremely low current of node B flows through resistor R7 to the voltage stabilization circuit and is lower than the starting voltage of the step-down voltage regulator chip U1, the step-down voltage regulator chip U1 stops running, and the resistors R9 and R11 have no output, and finally the LED light string control circuit 20 stops running, thereby achieving the purpose of protecting the LED light string control circuit and the input power supply. When the LED light string returns to normal, at this point, the voltage at node C rises, the voltage difference between node B and node C decreases, the third switch transistor Q3 is disconnected, node D is suspended, the fourth switch transistor Q4 is disconnected, and the voltage at node E rises, causing the second switch transistor Q2 to turn on and reach a bias current of the first switch transistor Q1, thereby turning on the first switch transistor Q1, and restoring the circuit to normal operation.

Referring to FIG. 1 and FIG. 2 of the drawings, the protection circuit 10 is connected to the LED light string control circuit 20. The LED light string control circuit 20 comprises an LED light string forward and reverse output circuit 21, a step-down voltage stabilization circuit 22 and a main control chip U2, which is connected to an external LED light string through light string output nodes 01 and 02. The LED light string forward and reverse output circuit 21 comprises field effect transistors T1, T2, T3, T4 and resistors R9, R10, R11, R12, R13, R14, R15, R16, R17, which can output current in forward and reverse directions. The electrodes of the field effect transistors T1, T2 and the field effect transistors T3, T4 have a reverse connection, and a collector of the field effect transistors T1 and T4 and a collector of the field effect transistors T2 and T3 are connected by connecting wires. The field effect transistors T1, T2, T3, T4 can also be switch transistors.

The connecting wires of the field effect transistors T1 and T4 and the field effect transistors T2 and T3 are connected in parallel with the LED light strings LED1, LED2 (LED1 and LED2 are the output of the forward and reverse circuit 21, and also the output of the entire circuit light string (load)) and the resistor R17. The field effect transistors T1, T2, T3, T4 are respectively connected with the resistors R10, R12, R13, R14, R15, R16. The power of each of the field effect transistors T1, T2, T3, and T4 determines the output current of the LED light string and the efficiency of protection. According to this embodiment, the power of field effect transistors T1, T2, T3, and T4 is above 1 W. The main control chip U2 of the LED light string control circuit is connected to the step-down voltage stabilization circuit 22 through the resistor R8, and is connected to the field effect transistor T1 of the LED light string control circuit through the resistors R9 and R10. The main control chip U2 is also connected to the RF input interface of the wireless receiving circuit 30, and the main control chip U2 is connected to an on-off switch SW, which is arranged to disconnect the main control chip U2 from the LED light string control circuit 20 when the protection circuit 10 is turned off due to leakage or short circuit and the step-down voltage regulator chip U1 stops running. The main control chip U2 is used to collect data and perform on-off control on the protection circuit 10, the LED light string control circuit 20 and the wireless receiving circuit 30.

Preferably, the resistor R10 is the lower bias resistor of T1 for accelerating the cutoff of T1. The resistor R12 is the lower bias resistor of T2 for accelerating the cutoff of T1. The resistor R13 is the pull-down resistor of T1 for accelerating the conduction of T3; and the resistor R14 is the upper bias resistor of T3 for accelerating the cutoff of T3. Similarly, the resistor R15 is the pull-down resistor of T4 for accelerating the conduction of T4; and the resistor R16 is the upper bias resistor of T4 for accelerating the cutoff of T4.

Referring to FIG. 1 and FIG. 2 of the drawings, when the LED light string forward and reverse output circuit 21 is working, and when the 9th pin of the main control chip U2 outputs a high level and the 8th pin of the main control chip U2 outputs a low level, the high level passes through the resistor R9 and is limited by the resistor R9 while the resistor R10 triggers the field effect transistor T1. At this point, the collector of the switching transistor Q1 is at a low level, and the resistors R13 and R14 are the lower bias resistor and the upper bias resistor of the field effect transistor T3. When the switch transistor Q1 is at a low level, the resistor R13 triggers the field effect transistor T3, making the collector of the switch transistor Q2 at a high level, and the output LED light string LED2 is lit due to the unidirectional conductive characteristic, while the LED light string LED1 is in a reverse cutoff state. When the 9th pin of the main control chip U2 outputs a low level and the 8th pin outputs a high level, the high level is limited by the resistor R11 and triggers the field effect transistor T2 through the lower bias resistor R12, so that the collector of the switching transistor Q2 is a low level. At the same time, the resistors R15 and R16 are the lower bias resistor and the upper bias resistor of the field effect transistor T4. When the switching transistor Q2 is at a low level, the resistor R15 triggers the field effect transistor T4, making the switching transistor Q1 at a high level, and the output LED light string LED1 is lit because the LED has a unidirectional conductive characteristic, and the LED light string LED2 is in a reverse cut-off state, thereby realizing the forward and reverse non-polar working process of the entire circuit. The resistors R10, R12, R14, and R16 in the forward and reverse output circuits of the LED light string are bias resistors arranged to quickly cut off the field effect transistors T1, T2, T3, and T4. In order to prevent the LED light string from having residual light output, the resistor R17 is used as a discharge resistor.

It is worth mentioning that high and low levels refer to the voltage magnitudes for different devices in the circuit. For example, when the LED light string forward and reverse output circuit 21 is working, the high level outputted by the 9th pin of the main control chip U2 means the on-voltage of T1, and the low level outputted by the 8th pin means the off-voltage of T2. Similarly, the high and low levels of T3 and T4 are also the on-voltage and off-voltage, and the high and low levels of Q1 and Q2 refer to the on-voltage and off-voltage of the LED.

As shown in FIG. 1 and FIG. 2, the step-down voltage stabilization circuit 22 comprises a step-down voltage regulator chip U1, capacitors C1, C2, C3, C4, a crystal oscillator Y1 and a resistor R8. The capacitors C1, C2, C3, C4 and the crystal oscillator Y1 are connected between the step-down voltage regulator chip U1 and the main control chip U2. The step-down voltage regulator chip U1 has a built-in step-down regulator circuit, which is connected to the protection circuit 10 through the resistor R7, and connected to the main control chip U2 through the resistor R8 and the capacitor C2, and is used to provide a stable voltage for the protection circuit 10 and the LED light string control circuit 20.

As shown in FIG. 1 and FIG. 2, the present invention provides a wireless receiving circuit 30 that can be used selectively. The wireless receiving circuit 30 comprises an RF chip U3, a crystal oscillator Y2 connected in parallel to the RF chip U3, inductors L1 and L2 connected in parallel to capacitors C5 and C6 on the RF chip U3, and capacitors C7 and C8 connected in parallel to resistor R18 on the RF chip U3. The wireless receiving circuit 30 is connected to the radio frequency interface of the main control chip U2, and is connected to the antenna ANT through capacitors C5, C6 and inductors L1 and L2 connected in parallel. A user can wirelessly remotely control the functions and opening and closing of the LED light string through the wireless receiving circuit 30.

The present invention, while illustrated and described in terms of a preferred embodiment and several alternatives, is not limited to the particular description contained in this specification. Additional alternative or equivalent components could also be used to practice the present invention.

What is claimed is:

1. An overcurrent and overload protection circuit of an LED light string, comprising a protection circuit (10) connected to a power circuit, an LED light string control circuit (20) connected to said protection circuit (10), and a wireless receiving circuit (30) connected to said LED light string control circuit (20) for remotely controlling the LED light string, wherein said protection circuit (10) comprises: comprises a first switch transistor Q1, a second switch transistor Q2, a third switch transistor Q3, and a fourth switch transistor Q4 for preventing the LED light string from overcurrent and overload, said first switch transistor Q1, said second switch transistor Q2, and said fourth switch transistor Q4 are connected in parallel to an input terminal of a power supply, and said third switch transistor Q3 is connected in parallel with said first switch transistor Q1 and said fourth switch transistor Q4 respectively; and said LED light string control circuit (20) comprises an LED light string forward and reverse output circuit (21), a step-down voltage stabilization circuit (22) and a main control chip U2 connected to said LED light string forward and reverse output circuit (21).

2. The overcurrent and overload protection circuit of the LED light string according to claim 1, wherein said protection circuit (10) comprises resistors R1, R4, R2, R3, R7, a current limiting resistor RL and a sampling resistor R6, wherein said first switch transistor Q1, said second switch transistor Q2, and said fourth switch transistor Q4 are connected to an external power supply through resistors R1, R4, R2, and R3, said third switch transistor Q3 is connected to said first switch transistor Q1 and said fourth switch transistor Q4 respectively, and is connected to said step-down voltage stabilization circuit (22) of said LED light string control circuit through said current limiting resistor RL, said sampling resistor R6 and said resistor R7 connected in parallel with said third switch transistor Q3.

3. The overcurrent and overload protection circuit of the LED light string according to claim 1, wherein said LED light string forward and reverse output circuit (21) comprises field effect transistors T1, T2, T3, T4 and resistors R10, R12, R13, R14, R15, R16, collectors of said field effect transistors T1 and T4 are connected, the collectors of said field effect transistors T2 and T3 are connected, and a connecting wire between said field effect transistors T1 and T4 and said field effect transistors T2 and T3 are connected in parallel with LED light strings LED1, LED2 and resistor R17, and said field effect transistors T1, T2, T3, and T4 are respectively connected with said resistors R10, R12, R13, R14, R15, and R16.

4. The overcurrent and overload protection circuit of the LED light string according to claim 1, wherein said step-down voltage stabilization circuit (22) of the LED light string control circuit comprises a step-down voltage regulator chip U1; capacitors C1, C2, C3, C4 connected between said step-down voltage regulator chip U1 and said main control chip U2; a crystal oscillator Y1; and a resistor R8.

5. The overcurrent and overload protection circuit of the LED light string according to claim 1, wherein said main control chip U2 of said LED light string control circuit is connected to said step-down voltage stabilization circuit (22) through a resistor R8, and is connected to a field effect transistor T1 of said LED light string control circuit through resistors R9 and R10, and said main control chip U2 is further connected to an RF input interface of said wireless receiving circuit (30) and is connected to an on-off switch SW.

6. The overcurrent and overload protection circuit of the LED light string according to claim 1, wherein said wireless receiving circuit (30) is connected to said main control chip U2 for wireless remote control of the LED light string, which comprises an RF chip U3, a crystal oscillator Y2 connected in parallel to said RF chip U3, inductors L1 and L2 connected in parallel to capacitors C5 and C6 on said RF chip U3, and capacitors C7 and C8 connected to said RF chip U3 and in parallel to resistor R18.

7. The overcurrent and overload protection circuit of the LED light string according to claim 1, wherein said LED light string control circuit (20) is connected to an external LED light string through light string output nodes 01 and 02.

8. The overcurrent and overload protection circuit of the LED light string according to claim 1, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

9. The overcurrent and overload protection circuit of the LED light string according to claim 2, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

10. The overcurrent and overload protection circuit of the LED light string according to claim 3, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

11. The overcurrent and overload protection circuit of the LED light string according to claim 4, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

12. The overcurrent and overload protection circuit of the LED light string according to claim 5, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

13. The overcurrent and overload protection circuit of the LED light string according to claim 6, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

14. The overcurrent and overload protection circuit of the LED light string according to claim 7, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

15. The overcurrent and overload protection circuit of the LED light string according to claim 2, wherein said LED light string forward and reverse output circuit (21) comprises field effect transistors T1, T2, T3, T4 and resistors R10, R12, R13, R14, R15, R16, collectors of said field effect transistors T1 and T4 are connected, the collectors of said field effect transistors T2 and T3 are connected, and a connecting wire between said field effect transistors T1 and T4 and said field effect transistors T2 and T3 are connected in parallel with LED light strings LED1, LED2 and resistor R17, and said field effect transistors T1, T2, T3, and T4 are respectively connected with said resistors R10, R12, R13, R14, R15, and R16.

16. The overcurrent and overload protection circuit of the LED light string according to claim 15, wherein said step-down voltage stabilization circuit (22) of the LED light string control circuit comprises a step-down voltage regulator chip U1; capacitors C1, C2, C3, C4 connected between said step-down voltage regulator chip U1 and said main control chip U2; a crystal oscillator Y1; and a resistor R8.

17. The overcurrent and overload protection circuit of the LED light string according to claim 16, wherein said main control chip U2 of said LED light string control circuit is connected to said step-down voltage stabilization circuit (22) through a resistor R8, and is connected to a field effect transistor T1 of said LED light string control circuit through resistors R9 and R10, and said main control chip U2 is further connected to an RF input interface of said wireless receiving circuit (30) and is connected to an on-off switch SW.

18. The overcurrent and overload protection circuit of the LED light string according to claim 17, wherein said wireless receiving circuit (30) is connected to said main control chip U2 for wireless remote control of the LED light string, which comprises an RF chip U3, a crystal oscillator Y2 connected in parallel to said RF chip U3, inductors L1 and L2 connected in parallel to capacitors C5 and C6 on said RF chip U3, and capacitors C7 and C8 connected to said RF chip U3 and in parallel to resistor R18.

19. The overcurrent and overload protection circuit of the LED light string according to claim 18, wherein said LED light string control circuit (20) is connected to an external LED light string through light string output nodes 01 and 02.

20. The overcurrent and overload protection circuit of the LED light string according to claim 19, under a leakage or a short circuit condition occurred at output nodes 01 and 02 of the LED light string, a current in said LED light string control circuit rises sharply, causing a voltage across said current limiting resistor RL to rise synchronously, when a voltage at a node C is lower than a voltage of a node B by a preset value, said third switch transistor Q3 is turned on, said resistor R5 limits the current and then said fourth switch transistor Q4 is turned on and a voltage of a node E is proximal to 0V, thereby causing said second switch transistor Q2 being turned off immediately; at the same time, a high voltage reaches a base of said first switch transistor Q1 through said resistors R2 and R3 such that said first switch transistor Q1 is disconnected while an output at the node B is suspended, then an extremely low current at the node B fails to start said step-down voltage regulator chip U1, causing said step-down voltage regulator chip U1 stop running, then said resistors R9 and R11 have no output, and said LED light string control circuit (20) is disconnected, thereby achieving overcurrent and overload protection of the LED light string, when the LED light string returns to normal, a voltage at the node C rises, said third switch transistor Q3 is disconnected while the node D is suspended, said fourth switch transistor Q4 is disconnected, and then a voltage at the node E rises back up, said second switch transistor Q2 is turned on and said first switch transistor Q1 is turned to resume normal working condition.

* * * * *